(12) United States Patent
Pohjola et al.

(10) Patent No.: US 12,182,254 B2
(45) Date of Patent: Dec. 31, 2024

(54) METHOD AND SYSTEM FOR PROVIDING AN ELECTRONIC CREDENTIAL ASSOCIATED WITH ELECTRONIC IDENTIFICATION INFORMATION

(71) Applicant: Sony Group Corporation, Tokyo (JP)

(72) Inventors: Teemu Veikko Tapani Pohjola, Stuttgart (DE); Hugo Embrechts, Stuttgart (DE); Rik Claesen, Stuttgart (DE); Tomasz Korwin-Gajkowski, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 209 days.

(21) Appl. No.: 17/799,269

(22) PCT Filed: Mar. 8, 2021

(86) PCT No.: PCT/EP2021/055709
§ 371 (c)(1),
(2) Date: Aug. 12, 2022

(87) PCT Pub. No.: WO2021/190907
PCT Pub. Date: Sep. 30, 2021

(65) Prior Publication Data
US 2023/0075539 A1 Mar. 9, 2023

(30) Foreign Application Priority Data
Mar. 27, 2020 (EP) ..................... 20166113

(51) Int. Cl.
*G06F 21/45* (2013.01)
(52) U.S. Cl.
CPC .................... *G06F 21/45* (2013.01)

(58) Field of Classification Search
CPC . G06F 21/45; H04W 12/108; H04W 12/0471; H04W 12/33; H04W 12/63;
(Continued)

(56) References Cited

U.S. PATENT DOCUMENTS 10,127,378 B2 * 11/2018 Toth ..................... H04W 12/126
10,681,024 B2 * 6/2020 Badri ..................... H04L 63/06
(Continued)

FOREIGN PATENT DOCUMENTS

BR 102019001478 A1 8/2019

OTHER PUBLICATIONS

International Search Report and Written Opinion mailed on May 6, 2021, received for PCT Application PCT/EP2021/055709, filed on Mar. 8, 2021, 12 pages.
(Continued)

*Primary Examiner* — Christopher A Revak
(74) *Attorney, Agent, or Firm* — XSENSUS LLP

(57) ABSTRACT

The present disclosure relates to a system for providing an electronic credential associated with electronic identification information of a user. The system comprises one or more electronic sensor devices configured to monitor an activity or a surrounding of the user and to generate user-specific sensor data, processing circuitry configured to analyze the user-specific sensor data to extract characteristic data associated with the user, and to generate a sensed electronic credential confirming the extracted characteristic data; and a memory configured to store the sensed electronic credential as part of the user's electronic identification information.

16 Claims, 3 Drawing Sheets

(58) Field of Classification Search
CPC .. H04W 12/65; H04W 12/068; H04L 63/0861
See application file for complete search history.

(56) References Cited

U.S. PATENT DOCUMENTS

| | | | | |
|---|---|---|---|---|
| 10,915,895 | B1* | 2/2021 | Fogg | G06Q 20/0655 |
| 11,010,758 | B2* | 5/2021 | Sooudi | G06Q 20/3224 |
| 11,756,080 | B1* | 9/2023 | Viswanath | G06Q 20/203 705/15 |
| 2016/0080936 | A1 | 3/2016 | Rachuri et al. | |
| 2017/0038848 | A1 | 2/2017 | Yuen et al. | |
| 2019/0087830 | A1* | 3/2019 | Mercury | G09B 7/00 |
| 2019/0087831 | A1 | 3/2019 | Mercury et al. | |
| 2019/0089701 | A1* | 3/2019 | Mercury | G06Q 10/105 |
| 2019/0164156 | A1 | 5/2019 | Lindemann | |
| 2019/0197517 | A1* | 6/2019 | Senguttuvan | G06K 19/0719 |
| 2019/0289017 | A1 | 9/2019 | Agarwal | |
| 2020/0226245 | A1* | 7/2020 | Wong | H04L 63/08 |
| 2020/0349520 | A1* | 11/2020 | Mughal | H04L 63/0823 |
| 2023/0032328 | A1* | 2/2023 | Burgess | H04L 63/205 |
| 2024/0104188 | A1* | 3/2024 | Villanueva Gaviola | G06F 21/32 |

OTHER PUBLICATIONS

Tobin, "Sovrin: What Goes on the Ledger?", A white paper from Evernym in cooperation with the Sovrin Foundation, Available Online at: https://sovrin.org/wp-content/uploads/2017/04/What-Goes-On-The-Ledger.pdf, Apr. 2017, pp. 1-10.

Hardman, "How DIDs, Keys, Credentials, and Agents Work in Sovrin", Sovrin, Available Online at: https://sovrin.org/wp-content/uploads/2019/01/How-DIDs-Keys-Credentials-and-Agents-Work-Together-in-Sovrin-131118.pdf, Apr. 2018, 7 pages.

Gibb, "Why I'm excited about Self-Sovereign Identity", Available Online at: https://www.offerzen.com/blog/why-im-excited-about-self-sovereign-identity, Retrieved from net on: Mar. 16, 2020, pp. 1-15.

Ruff, Verifiable Credentials 101 for SSI: An intro and technical explanation, Available Online at: https://www.slideshare.net/SSIMeetup/verifiable-credentials-101-for-ssi-and-decentralized-digital-identity-tyler-ruff, Sep. 18, 2018, 12 pages.

Hammudoglu et al., "Portable Trust: biometric-based authentication and blockchain storage for self-sovereign identity systems" Student Project, vol. 1, Available Online at: https://www.groundai.com/project/portable-trust-biometric-based-authentication-and-blockchain-storage-for-self-sovereign-identity-systems/1, Jun. 12, 2017, pp. 1-7.

Abishek et al., "IoT based Smart Band for Biometric Authentication Using Blockchain Technology", International Journal of Recent Technology and Engineering (IJRTE), vol. 7, Issue—5C, Feb. 2019, pp. 175-181.

"Implementation of Secure Authentication Technologies for Digital Financial Services", Financial Inclusion Global Initiative (FIGI), Telecommunication Standardization Sector of ITU, Aug. 2019, pp. 1-71.

Windley et al., "Sovrin (TM): A Protocol and Token for Self-Sovereign Identity and Decentralized Trust" A White Paper from the Sovrin Foundation, Version 1.0, Jan. 2018, pp. 1-42.

* cited by examiner

METHOD AND SYSTEM FOR PROVIDING AN ELECTRONIC CREDENTIAL ASSOCIATED WITH ELECTRONIC IDENTIFICATION INFORMATION

CROSS-REFERENCE TO RELATED APPLICATIONS

The present application is based on PCT filing PCT/EP2021/055709, filed Mar. 8, 2021, which claims priority to EP 20166113.9, filed Mar. 27, 2020, the entire contents of each are incorporated herein by reference.

FIELD

The present disclosure relates to methods and apparatuses for providing an electronic or digital credential associated with electronic or digital identification information of a user, which can be used for proving the user's identity in electronic transactions via the internet, for example.

BACKGROUND

As the internet grows rapidly, saving and accessing sensitive information of users is becoming more and more important. The internet lacks a layer of identity protocol, and this has shifted responsibility for identification and verification to service providers. Over time, the service providers have each realized their own ways of identifying and managing personal data related to their customers. This has resulted in user's data being fragmented into disconnected silos which have been connected to each other using one-to-one data exchange connections. When these data exchange connections are established, also inherently the trustworthiness of different data providers is being assessed. For example, a government can be seen as trusted issuer of data related to the user's driver's licence, a bank can be seen as a trusted issuer of data related to user's credit rating, a bus company can be seen as a trusted issuer of data related to user's monthly transporatation subscription, etc. This can be highly inefficient due to duplication of information and can also prevent users to gain insight in and control over their personal digital identity. Since most identity management systems rely on centralized databases, it poses a threat to the user when compromised. New identity management schemes, addressing the abovementioned issues by utilizing the same digital identity on different sites, were proposed. Some currently available examples are Facebook Login and Google Login. One does not need a username and password anymore to sign up for a particular platform, reducing the information duplication problem. Also, since federated instances like Facebook and Google are trusted to have a secure digital identity policy, it seems that the authorization problem is also tackled. However, this means that users have to rely on the federated instances and trust these instances which makes them powerful. This way the users still have no control over their digital identity since they do not know what data is exactly collected and what it is used for.

Self-Sovereign Identity (SSI) is an emerging concept where the user "owns" and controls his/her digital personal data. This digital personal data can be stored as electronic or digital credentials to a digital wallet application (e.g. credential about data of birth). Using the digital wallet application, a user can share credentials to $3^{rd}$ parties (e.g. prove that she is over 18 years old by providing credential about her data of birth to $3^{rd}$ party requesting the information). The authencity, trustworthiness and interoperability of electronic credentials can be ensured by Distributed Ledger Technology (DLT). Thus, SSI removes the need for a central trusted authority.

SUMMARY

A need for improvement is addressed by the subject matter of the independent claims. Further, possibly advantageous embodiments are addressed by the dependent claims.

According to a first aspect of the present disclosure, it is provided a method for providing an electronic or digital credential associated with electronic or digital identification information of a user. The method includes generating, by using one or more electronic sensor devices, user-specific sensor data based on monitoring an activity or a surrounding of the user, extracting characteristic data associated with the user based on analyzing the user-specific sensor data, generating a sensed electronic credential confirming the extracted characteristic data, and storing the sensed electronic credential as part of the user's electronic identification information.

According to a second aspect of the present disclosure, it is provided a system for providing an electronic credential associated with electronic identification information of a user. The system comprises one or more electronic sensor devices configured to monitor an activity or a surrounding of the user and to generate user-specific sensor data. The system further comprises processing circuitry configured to analyze the user-specific sensor data to extract characteristic data associated with the user and to generate a sensed electronic credential confirming the extracted characteristic data. The system further comprises a memory configured to store the sensed electronic credential as part of the user's electronic identification information.

The sensed electronic credentials can overcome aforementioned issues related to verified credentials and self-attested credentials by generating trustworthy credentials automatically using electronic sensor devices and processing circuitry, even without involving a trusted $3^{rd}$ party.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
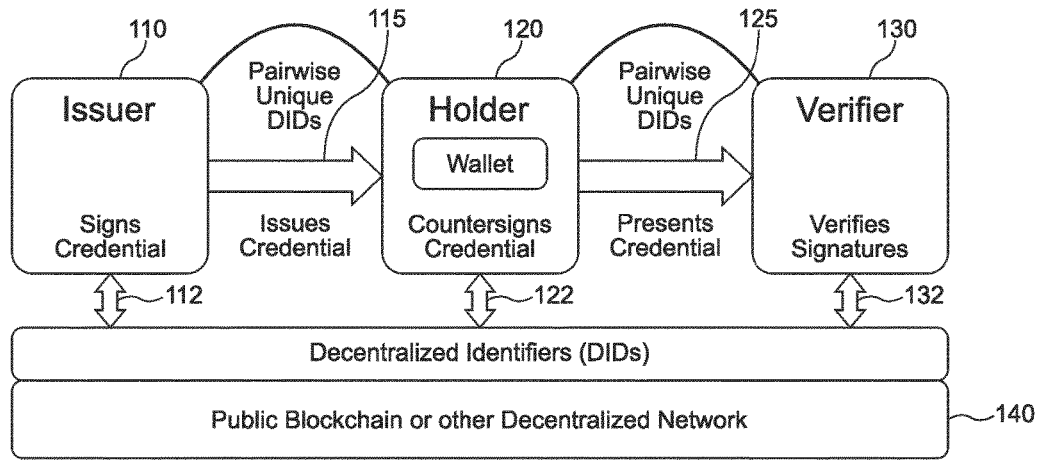
FIG. 1 shows an overview of a Decentralized identifier (DID) network structure.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Authencity, trustworthiness and interoperability of electronic credentials can be ensured by Distributed Ledger Technology (DLT) or other forms of decentralized networks. DLT is known as a consensus of replicated, shared, and synchronized digital data geographically spread across multiple sites, countries, or institutions. There is no central administrator or centralized data storage. A peer-to-peer network (P2P) is needed as well as consensus algorithms to ensure replication across nodes is undertaken. One form in of distributed ledger design is the blockchain system. The emergence of DLT and blockchain technology provides an opportunity for fully decentralized identity management. In a decentralized identity system, entities (e.g., discrete identifiable units such as, but not limited to, people, organizations, and things) are free to use any shared root of trust. Distributed ledgers, decentralized P2P networks, or other systems with similar capabilities, may provide means for managing a root of trust without introducing a centralized authority or a single point of failure. In combination, DLTs and decentralized identity management systems may enable any entity to create and manage their own identifiers on any number of distributed, independent roots of trust. Entities may be identified by Decentralized Identifiers (DIDs), and can authenticate using proofs (for example, digital signatures, privacy-preserving biometric protocols, and so on).

DID is a digital identification mechanism which assigns a standard, cryptographically verifiable, globally unique and permanent identity to an entity (such as individuals, organizations, and things), which is completely under the entity's or identity owner's control and does not depend on central authorities. Public-key cryptography may be used in DID, as each DID may come with an asymmetric key pair (a public and an associated private key.) The control of a DID may be managed through control of the DID's private key. DIDs provide an identity owner an encrypted private channel with another identity owner. Identity owners may use DIDs to identify themselves. Each DID may resolve to a DID document (DID descriptor object), which may contain DID's cryptographic keys, publicly available metadata (if any) regarding the DID owner, and resource pointers for the discovery of endpoints for initiating interactions with the DID owner. A DID document can be understood as a set of data describing the identity owner (DID subject), including mechanisms, such as public keys and pseudonymous biometrics, that the identity owner can use to authenticate itself and prove their association with the DID. A DID document might also contain other attributes or claims describing the identity owner. DID documents may be graph-based data structures that may be typically expressed using JSON-LD (JavaScript Object Notation for Linked Data) but can be expressed using other compatible graph-based data formats. Each DID may use a specific DID method, defined in a separate DID method specification, to define how the DID is registered, resolved, updated, and revoked on a specific DLT or network. Resolving from a DID to a DID document may be performed by a DID resolver, which is a software or hardware component with an API for resolving DIDs of at least one DID method. It executes the read operation for the DID method corresponding to the DID being resolved to obtain the authoritative DID document.

Electronic credentials are proofs for identity owners to assert their license or qualification on certain things, for example. They may be widely used in individuals' daily lives. Driver's licenses, university diplomas and travel passports are some examples of credentials. Verifiable electronic credentials are machine readable, privacy respecting, cryptographically secure digital credentials of identity owners. Verifiable electronic credentials support Self-Sovereign Identity (SSI), such that identity owners may accumulate electronic credentials into an identity account (digital SSI wallet) and use the electronic credentials to prove who they are. Verifiable electronic credentials usually involve a (trusted) third-party attestation but can also be self-attested. Attestation may be done by exploiting the concept of digital signatures. An attester (issuer) having a DID creates a verifiable credential by signing identity owner's records using its private key, and the credential is cryptographically verifiable by a verifier using the attester's public key. Verifiers count on the credibility of issuers to trust the credentials. This concept is depicted in FIGS. 1 and 2.

FIG. 1 shows an overview of a DID network structure and how electronic credentials can be used in conjunction with DIDs.

An electronic credential issuer 110 (attester) having an associated DID 112 can create a verifiable electronic credential 115 by accessing and cryptographically signing records of an identity owner 120 having a DID 122. Identity owner 120 receives his cryptographically signed records in the form of cryptographically verifiable credentials from issuer 110 and may keep them locally in his digital wallet operating on an electronic device, such as a smartphone, laptop computer, or the like. The electronic credential 115 of identity owner 120 with DID 122 can be provided to a verifier 130 having DID 132. The electronic credential 115 is cryptographically verifiable by verifier 130 e.g. by using the issuer's 110 public key which is available via its associated DID 112 (and DID document). Each party 110, 120, 130 may store an electronic credential and/or consent receipt locally and record a proof of or a reference (containing no private information) to that electronic credential on DLT 140. This proof or reference which, thanks to immutability of DLT 140, may allow either party to provide irrefutable, auditable proof of the credential if required in the future. An electronic credential may contain one or more DIDs that attested information, and attribute names and data types that were attested (rather than the actual data itself) and may be signed by one or both parties to provide non-repudiation. A proof which is stored on DLT 140 may be a cryptographic hash of this credential.

Figure 2:
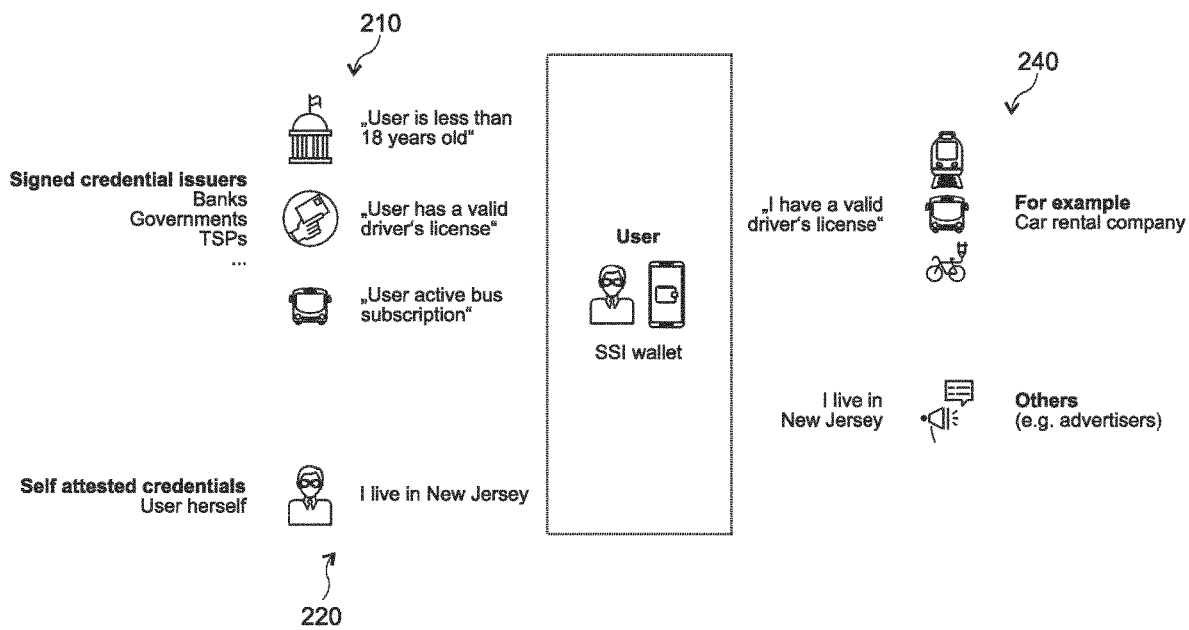
FIG. 2 illustrates a concept of verified and self-attested electronic credentials.

FIG. 2 illustrates the concept of verified and self-attested electronic or digital credentials.

Verified digital or electronic credentials 210 are electronic credentials which may be issued by a trusted party, such as governments, banks, or other trusted service providers. For example, a government can issue verified electronic credentials containing information about a user's driver's licence and/or age, a bank can issue verified electronic credentials containing information about a user's credit rating, a public transportation company can issue verified electronic credentials containing information about user's monthly transporatation subscription, etc. In addition to situations where a trusted authority is required to verify the authenticity of data, there are instances when trusted authority either cannot verify data, or the verification is not required. In these cases user can issue so called self-attested electronic credential 220 declaring that (s)he likes ice cream, a user can issue self-attested electronic credential declaring that (s)he is best friends with another user, a user can issue self-attested electronic credential declaring that she lives in New York (but this credential might be invalid), etc. Both, verified electronic credentials 210 and self-attested electronic credentials 220 may be stored in the user's digital SSI wallet application 230. Using the digital wallet 230, the user can share his/her electronic credentials 210, 220 to 3$^{rd}$ parties 240, e.g., to prove that (s)he has a valid driver's licence or provide his/her location.

Both verified credentials 210 and self-attested electronic credentials 220 have different problems. At the moment, the number of parties issuing verified electronic credentials is very small (e.g. no government is issuing electronic credentials about user's driver's lisence). For verified electronic credentials to be trustworthy, trust towards issuing party must be established (e.g. hospital cannot issue trustworthy electronic credentials about driver's lisence, but can be a trusted to issue electronic credentials related to health of the user). This 'governance framework' is at the time just being designed. On the other hand, trustworthiness of self-attested credentials is very low. In essence, self-attested credential can contain any information which user claims about herself, without anyone being able to validate accuracy of claims.

Thus, there is a need to bridge the gap between verified electronic credentials and self-attested electronic credentials.

The present disclosure proposes an intermediate level of digital or electronic credentials which will be referred to as sensed electronic credentials in the following. A sensed electronic credential may be used to substantiate a user's/identity owner's claim based on user-specific sensor data generated by one or more electronic sensor devices associated with the user/identity owner. The sensed electronic credential is then created based on the user-specific sensor data.

Figure 3:
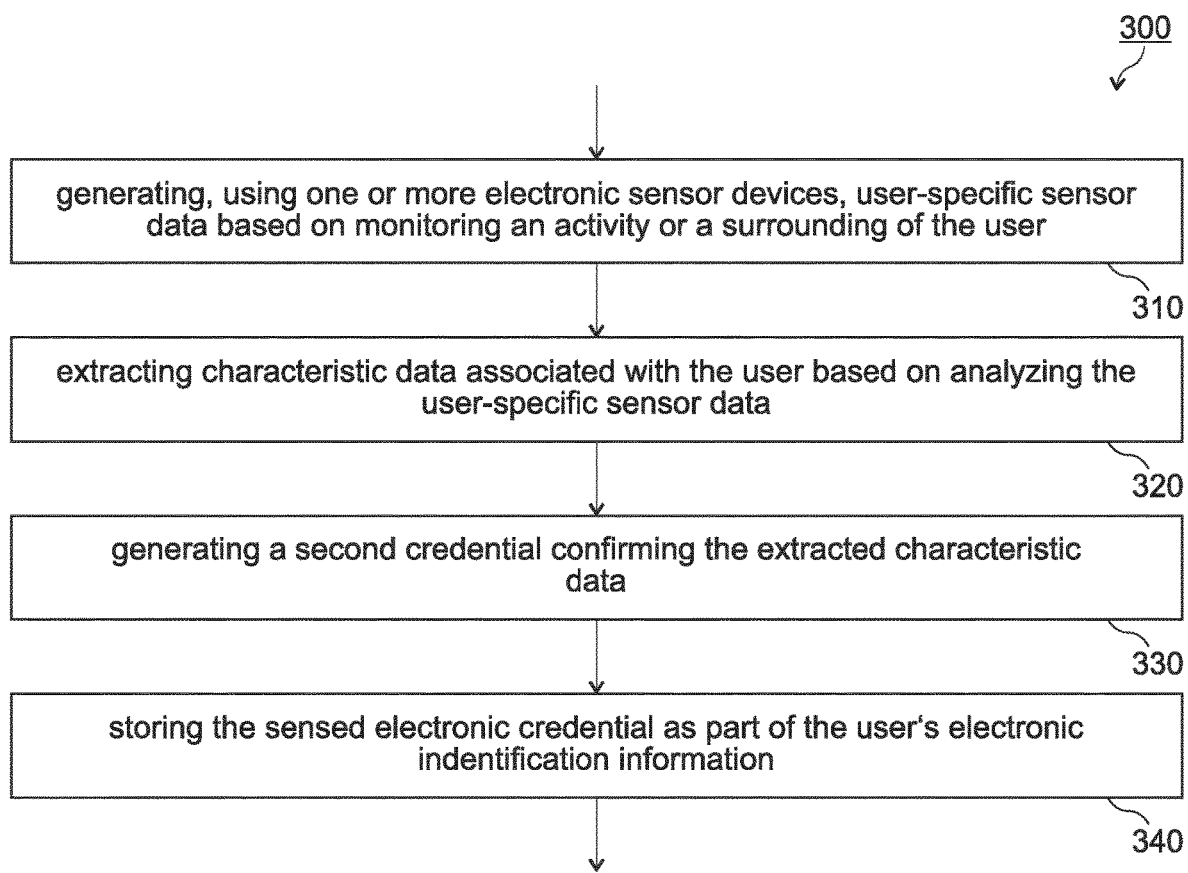
FIG. 3 shows a flowchart of a method for providing a sensed electronic credential associated with electronic identification information of a user.

FIG. 3 shows an overview of a method 300 for providing a sensed electronic credential associated with electronic identification information (e.g. DID) of a user.

Method 300 includes an act of generating 310 user-specific sensor data based on monitoring an activity, a habit, or a surrounding of the user. The user-specific sensor data is generated by using one or more electronic sensor devices.

The generated user-specific sensor data may be regarded as raw or low-level sensor data in some implementations, the raw sensor data representing measurements related to the activity, habit, or surrounding of the user. The electronic sensor devices for generating the user-specific sensor data can include various types of sensors, such as location sensors (e.g. GPS sensors), temperature sensors, accelerometers, gyroscopes, light sensors, cameras, lidars, radars, compasses, just to name a few examples. Combinations of multiple sensors in one electronic sensor device are also possible. Examples of electronic sensor devices include computers, smartphones, or wearable electronic devices (such as smartwatches, for example). Thus, generating 310 the user-specific sensor data may include using at least one of a sensor circuit implemented in a smartphone associated with the user, a sensor circuit implemented in a wearable electronic device attached to the user, an optical sensor monitoring the user, an environmental sensor installed in the surrounding of the user, a sensor monitoring service usage information. Examples of user activity/behavior or surrounding that can be monitored by the electronic sensor devices include the user's location, type and/or amount of movement, the user's vital signs (e.g. heartrate), temperature, visited websites, etc. The skilled person having benefit from the present disclosure will appreciate that possible sensor devices as well as user activities are manifold and dependent on what is to be certified by the credential.

An issue is that the user-specific sensor data can be tampered, meaning that the data is not correct. For example, the data from the sensor(s) can be altered immediately after being captured by the sensor(s). For another example, false data can be fed into the system which is pretending to be coming from a sensor. In order to render the sensor data more trustworthy, generating 310 the user-specific sensor data may optionally include digitally signing the sensor data by the one or more electronic sensor devices since a digital signature is a scheme for verifying the authenticity of digital data. For example, public-key cryptography may be used to digitally sign the sensor data. Digitally signing the sensor data by the electronic sensor device makes it harder or even impossible to tamper the sensor data. Additionally or alternatively, sensor data used to create sensed electronic credentials can be received from different sources. Some sensor data may be received from sensors signing the data. Some sensor data may be received from sensors not signing the data. Additionally or alternatively, a reliability score may be calculated (for the sensed electronic credential) based on judged quality and reliability of pure sensor data. If the data is originating from reliable sensors it may be considered more reliable.

Referring back to FIG. 3, method 300 further includes an act of extracting 320 characteristic data or information associated with the user based on analyzing the user-specific sensor data.

The characteristic data associated with the user (information characterizing the user) may be considered to be more abstract or higher-level than the raw user-specific sensor data, meaning that extracting 320 the characteristic data includes drawing conclusions about the user's characteristic activity, characteristic habits, characteristic surrounding, or user characteristics themselves. For example, extracting 320 the characteristic data may include at least one of analyzing sensed location data to extract a personal location or a motion profile of the user, analyzing sensed vital data to extract personal biometrical information (e.g. heartrate) of the user, analyzing sensed audio and/or video data to extract personal biometrical features (e.g., face, skin, hair color, etc.) of the user, analyzing sensed environmental data to extract information on the surrounding of the user, analyzing media data accessed by the user to extract the user's personal interests or patterns of service usage. The skilled person having benefit from the present disclosure will appreciate that many further characteristic data associated with the user is possible. For example, analyzing sensed audio and/or video data can also be used to extract conclusions about the user's actions, such as "the user is running", "the user is sleeping", or "the user is young/old", etc.

Typically, algorithms producing insights (information characterizing the user) from the raw user-specific sensor data may be a 'black box'. This means that there may be no way to verify how accurate these insights are. For example, a badly implemented algorithm might say that the user is a 'frequent jogger' if (s)he runs to catch a bus on most working days. In order to overcome this issue, a framework, e.g. a Governance framework within Sovrin SSI network, may be used to determine trustworthiness of different actors, which can be the entity which has implemented the algorithm, or the entity running a cloud service which does the data analysis (potentially using algorithms originating from different vendors/developers). The Sovrin Governance Framework (SGF) is the foundation of the Sovrin Network as a global public utility for self-sovereign identity. For example, a hospital may be deemed good to issue credentials about user's health related topics. For another example, a random coffee house should not be allowed to issue credentials related to the date of birth of a person. Additionally or alternatively, an entity both running the algorithms and issuing the sensed electronic credentials can be deemed trusted provider of insights. Such an entity may be added as the as one of the trusted providers within (existing) SSI Governance framework. It is Sovereign Foundation's governance framework which does these kinds of judgements.

Referring back to FIG. 3, once the characteristic data (insights) associated with the user is available, method 300 further includes an act of generating 330 a sensed electronic credential confirming (attesting) the extracted characteristic data.

Mechanisms of generating 330 sensed electronic credentials in principle follow technical mechanisms of generating verified or self-attested electronic credentials. For example, public-key cryptography (e.g. digital signature) may be used to attest the extracted characteristic data in form of a sensed electronic credentials. The difference to conventional verified or self-attested electronic credentials is, however, that the underlying data records, i.e., the extracted characteristic data, originate from one or more electronic sensor devices associated with the user but not from any centralized authorities or the user himself. In one example implementation, an electronic sensor device (e.g. the user's smartphone) can be used to generate or attest the sensed electronic credentials locally by in-device analytics and digitally signing extracted characteristic data. This may add an additional level of trust compared to self-attested credentials. In another example implementation, the user-specific sensor data may be transmitted from the one or more electronic sensor devices to a processing circuitry of a trusted entity (e.g. a trusted cloud service) for extracting the characteristic data by external analytics and generating the sensed electronic credential. Some examples of sensed electronic credentials are "I live in Powell Str. 432", "I work in Wall Str. 687", "I use metro on daily basis", "I commute via Station X, Y Z", "I use car during the week".

Once the sensed electronic credential is available, method 300 further includes storing 340 the sensed electronic credential as part of the user's electronic identification information. For example, the sensed electronic credential can be stored locally on an electronic device (e.g. a smartphone) associated with the user. For example, the sensed electronic credential may be stored to a digital "SSI wallet" application which user controls. Additionally, references (e.g., in form of one or more DID documents) how the sensed electronic credential can be located may be stored on at least one node of a DID network in which various network nodes may use a consensus protocol to maintain a shared ledger in which each transaction is cryptographically signed and chained to a previous transaction. When the sensed electronic credential is shared, agent programs of the issuer/attester (e.g., user's smartphone or other trusted entity) and verifier (e.g. a bar verifying user's age), may exchange information and confirm the validity of the sensed electronic credential via DLT (see FIG. 1).

In an example implementation, generating 310 the user-specific sensor data may include generating a hash of the sensor data. Generating 330 the sensed electronic credential may then comprise including the hash in the sensed electronic credential. Upon request of a remote network node (verifier) of a DID network verifying the sensed electronic credential, the user-specific sensor data on which the sensed electronic credential is based may be provided from the attester (e.g. electronic sensor device or trusted cloud service) to the verifier. In such embodiments, user-specific sensor data is captured from sensors. Then a hash of the user-specific sensor data is generated. The user-specific sensor data is analyzed to drawing conclusions about the user's habits (characteristic user data), and the sensed electronic credential is created. A user presents the sensed electronic credential (which contains the data hash) to $3^{rd}$ party. The $3^{rd}$ party can ask for the original data, compute the hash from it, and compare it to the hash in the credential. This ensures that the party receiving the credential receives original data which was used to create the credential.

Figure 4:
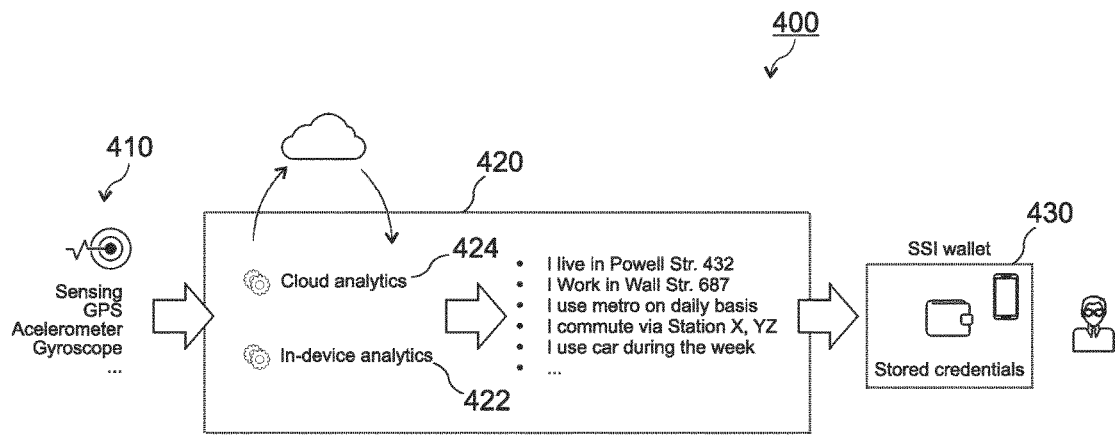
FIG. 4 illustrates different stages involved in providing sensed electronic credentials.

The method 300 for providing a sensed electronic credential is visualized in FIG. 4, illustrating a system 400 for providing an electronic credential associated with electronic identification information of a user.

System 400 comprises one or more electronic sensor devices 410 configured to monitor an activity or a surrounding of the user and to generate user-specific sensor data. System 400 comprises processing circuitry 420 configured to analyze the user-specific sensor data to extract characteristic data associated with the user, and to generate a sensed electronic credential confirming the extracted characteristic data. System 400 further comprises a memory 430 configured to store the sensed electronic credential as part of the user's electronic identification information.

As can be seen from FIG. 4, the processing circuitry 420 may be implemented in a portable electronic device (e.g. smartphone, wearable) 422 associated with the user. Alternatively, the processing circuitry 420 may be implemented in a cloud server 424 of a trusted entity for extracting the characteristic user data and generating the sensed electronic credential.

Figure 5:
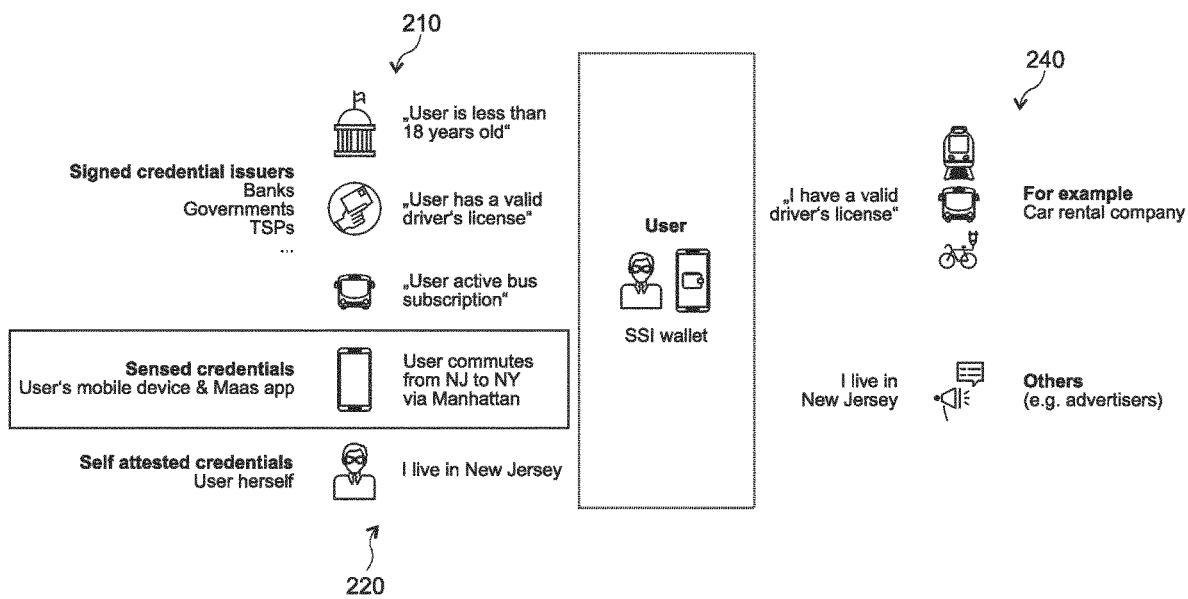
FIG. 5 illustrates a proposed concept of verified, self-attested, and sensed electronic credentials.

FIG. 5 illustrates that the sensed electronic credentials proposed herein can complement conventional verified and self-attested electronic credentials and thus provide an intermediate level of trustworthiness.

To summarize, 'sensed SSI credentials' proposed herein are designed to overcome afore mentioned problems related to 'verified credentials' and 'self-attested credentials', by generating trustworthy 'credentials' automatically without trusted $3^{rd}$ party.

Data is captured from electronic devices and services which are capable to sense information attributable to the user. This data may include, but is not limited to:
  GPS location data gathered from users mobile device
  Gyroscope or vital sign data gathered from a wearable devices
  Visual information feed from external monitoring devices (as cameras)
  Environmental information (e.g. temperature) from TOT devices and sensors
  Service usage information (e.g. watched movies in movie streaming service)

The collected data is analyzed either in device, on the edge, or in the cloud, to draw insights about user's behaviours and habits. These insights may include, but are not limited to:
  Location which user resides during the night time (presumed home adress)
  Typical routes which user takes using public transportation
  Amounts and types of different physical activities (e.g. user jogs 10 kilometers per week)
  User's driving style, and related risks
  Preferences on different types of media contents 'Sensed SSI credentials' corresponding to with the analyzed insights about the user are generated. These 'credentials' may include, but are not limited to:
  User is an active jogger
  User takes a train every weekday from station X to station Z
  User resides in New York
  User has travelled to China 'Sensed credentials' may be stored to user's SSI wallet (from where she can present them to $3^{rd}$ party).

Note that the present technology can also be configured as described below.

(1) Method for providing an electronic credential associated with electronic identification information of a user, the method comprising:
  generating, using one or more electronic sensor devices, user-specific sensor data based on monitoring an activity or a surrounding of the user;
  extracting characteristic data associated with the user based on analyzing the user-specific sensor data;
  generating a sensed electronic credential confirming the extracted characteristic data; and
  storing the sensed electronic credential as part of the user's electronic identification information.

(2) The method of (1), wherein generating the user-specific sensor data comprises using at least one of a sensor circuit implemented in a smartphone associated with the user, a sensor circuit implemented in a wearable electronic device attached to the user, an optical sensor monitoring the user, an environmental sensor installed in the surrounding of the user, a sensor monitoring service usage information.

(3) The method of (1) or (2), wherein extracting the characteristic data comprises at least one of analyzing sensed location data to extract a personal location or a motion profile of the user, analyzing sensed vital data to extract personal biometrical information of the user, analyzing sensed audio and/or video data to extract personal biometrical features of the user, analyzing sensed environmental data to extract information on the surrounding of the user, analyzing media data accessed by the user to extract the user's personal interests or patterns of service usage.

(4) The method of any one of (1) to (3), wherein generating the user-specific sensor data comprises digitally signing the sensor data by the one or more electronic sensor devices.

(5) The method of any one of (1) to (4), wherein generating the user-specific sensor data comprises generating a hash of the sensor data and wherein generating a sensed electronic credential comprises including the hash in the sensed electronic credential.

(6) The method of (5), further providing, upon request of a remote network node of a distributed identity network verifying the sensed electronic credential, the user-specific sensor data on which the sensed electronic credential is based.

(7) The method of any one of (1) to (6), further comprising
  transmitting the user-specific sensor data from the one or more electronic sensor devices to a processing circuitry of a trusted entity for extracting the characteristic data and generating the sensed electronic credential.

(8) The method of any one of (1) to (7), further comprising storing a reference to the electronic identification information on at least one node of a distributed identity network in which various network nodes use a consensus protocol to maintain a shared ledger in which each transaction is cryptographically signed and chained to a previous transaction.

(9) The method of any one of (1) to (8), further comprising verifying the sensed electronic credential between a first node of a distributed identity network and a second node of the distributed identity network as part of an electronic transaction to confirm an identity of the user.

(10) A computer program having a program code for performing a method of any one of the previous claims, when the computer program is executed on a programmable hardware device.

(11) System for providing an electronic credential associated with electronic identification information of a user, the system comprising:
  one or more electronic sensor devices configured to monitor an activity or a surrounding of the user and to generate user-specific sensor data;
  processing circuitry configured to
    analyze the user-specific sensor data to extract characteristic data associated with the user, and
    generate a sensed electronic credential confirming the extracted characteristic data; and
  a memory configured to store the sensed electronic credential as part of the user's electronic identification information.

(12) The system of (11), wherein the processing circuitry is implemented in a portable electronic device associated with the user.

(13) The system of (11), wherein the processing circuitry is implemented in a cloud server of a trusted entity for extracting the characteristic data and generating the sensed electronic credential.

(14) The system of any one of (11) to (13), further comprising a distributed identity network configured to store a reference to the sensed electronic credential on at least one node of the distributed identity network in which various network nodes use a consensus protocol to maintain a shared ledger in which each transaction is cryptographically signed and chained to a previous transaction.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method for providing an electronic credential associated with electronic identification information of a user, the method comprising:
   generating, using one or more electronic sensor devices, user-specific sensor data based on monitoring an activity or a surrounding of the user;
   extracting characteristic data associated with the user based on analyzing the user-specific sensor data, the characteristic data including a conclusion drawn from the user-specific sensor data and the conclusion drawn from the user-specific sensor data including at least one of a characteristic activity of the user, a characteristic habit of the user, or a characteristic surrounding of the user;
   generating a sensed electronic credential confirming the extracted characteristic data; and
   storing the sensed electronic credential as part of the user's electronic identification information.

2. The method of claim 1, wherein generating the user-specific sensor data includes using at least one of a sensor circuit implemented in a smartphone associated with the user, a sensor circuit implemented in a wearable electronic device attached to the user, an optical sensor monitoring the user, an environmental sensor installed in the surrounding of the user, or a sensor monitoring service usage information.

3. The method of claim 1, wherein extracting the characteristic data includes at least one of analyzing sensed location data to extract a personal location or a motion profile of the user, analyzing sensed vital data to extract personal biometrical information of the user, analyzing sensed audio and/or video data to extract personal biometrical features of the user, analyzing sensed environmental data to extract information on the surrounding of the user, or analyzing media data accessed by the user to extract the user's personal interests or patterns of service usage.

4. The method of claim 1, wherein generating the user-specific sensor data comprises digitally signing the sensor data by the one or more electronic sensor devices.

5. The method of claim 1,
wherein generating the user-specific sensor data comprises generating a hash of the sensor data, and
wherein generating the sensed electronic credential comprises including the hash in the sensed electronic credential.

6. The method of claim 5, further comprising providing, upon request of a remote network node of a distributed identity network verifying the sensed electronic credential, the user-specific sensor data on which the sensed electronic credential is based.

7. The method of claim 1, further comprising transmitting the user-specific sensor data from the one or more electronic sensor devices to a processing circuitry of a trusted entity for extracting the characteristic data and generating the sensed electronic credential.

8. The method of claim 1, further comprising storing a reference to the electronic identification information on at least one node of a distributed identity network in which various network nodes use a consensus protocol to maintain a shared ledger in which each transaction is cryptographically signed and chained to a previous transaction.

9. The method of claim 1, further comprising verifying the sensed electronic credential between a first node of a distributed identity network and a second node of the distributed identity network as part of an electronic transaction to confirm an identity of the user.

10. The method of claim 1, wherein the one or more electronic sensor devices that generated the user-specific sensor data also digitally signs the sensor data.

11. The method of claim 1,
wherein the one or more electronic sensor devices that generated the user-specific sensor data also generates a hash of the sensor data, and
wherein the sensed electronic credential includes the hash.

12. A non-transitory computer readable medium storing a computer program having a program code which when executed on a programmable hardware device causes the programmable hardware device to perform the method of claim 1.

13. A system for providing an electronic credential associated with electronic identification information of a user, the system comprising:
one or more electronic sensor devices configured to monitor an activity or a surrounding of the user and to generate user-specific sensor data;
processing circuitry configured to:
analyze the user-specific sensor data to extract characteristic data associated with the user, the characteristic data including a conclusion drawn from the user-specific sensor data and the conclusion drawn from the user-specific sensor data including at least one of a characteristic activity of the user, a characteristic habit of the user, or a characteristic surrounding of the user, and
generate a sensed electronic credential confirming the extracted characteristic data; and
a memory configured to store the sensed electronic credential as part of the user's electronic identification information.

14. The system of claim 13, wherein the processing circuitry is implemented in a portable electronic device associated with the user.

15. The system of claim 13, wherein the processing circuitry is implemented in a cloud server of a trusted entity for extracting the characteristic data and generating the sensed electronic credential.

16. The system of claim 13, further comprising a distributed identity network configured to store a reference to the sensed electronic credential on at least one node of the distributed identity network in which various network nodes use a consensus protocol to maintain a shared ledger in which each transaction is cryptographically signed and chained to a previous transaction.

* * * * *